US00RE43549E

(19) United States
(12) Reissued Patent
Koike et al.

(10) Patent Number: US RE43,549 E
(45) Date of Reissued Patent: Jul. 24, 2012

(54) WRITING DEVICE FOR DISPLAY MEMBERS ON DRUG CARRIER

(75) Inventors: Noaki Koike, Osaka (JP); Takafumi Ikeda, Osaka (JP)

(73) Assignee: Kabushiki Kaisha Yuyama Seisakusho, Osaka (JP)

(21) Appl. No.: 11/366,011

(22) Filed: Mar. 2, 2006

Related U.S. Patent Documents

Reissue of:
(64) Patent No.: 6,701,218
Issued: Mar. 2, 2004
Appl. No.: 09/990,388
Filed: Nov. 23, 2001

(30) Foreign Application Priority Data

Nov. 30, 2000 (JP) ..... 2000-364930

(51) Int. Cl.
*G06F 17/00* (2006.01)

(52) U.S. Cl. ..... 700/235; 700/220; 700/221; 700/225; 700/226; 700/227; 700/237; 53/135.1; 53/415

(58) Field of Classification Search ..... 400/697–700, 400/521; 700/220, 221, 225–227, 235, 237; 270/1.01, 1.02; 53/131.2, 411, 415, 460, 53/569, 135.1, 255; 29/775, 771; 156/DIG. 1–5, 156/DIG. 24–33, DIG. 37, DIG. 47
See application file for complete search history.

(56) References Cited

U.S. PATENT DOCUMENTS 5,468,711 A * 11/1995 Suzuki et al. ..... 503/201
5,555,010 A * 9/1996 Ohno et al. ..... 347/211
5,648,751 A 7/1997 Yuyama et al.
5,745,911 A * 4/1998 Sugiyama ..... 715/533
5,832,693 A * 11/1998 Yuyama et al. ..... 53/168
5,852,463 A * 12/1998 Koshida et al. ..... 347/171
5,982,129 A 11/1999 Belec et al.
6,181,979 B1 1/2001 Murakami
6,367,231 B1 4/2002 Yamamoto
6,447,625 B1 9/2002 Schmid et al.
6,449,927 B2 9/2002 Hebron et al.
6,540,127 B2 4/2003 Bednarz et al.

(Continued)

FOREIGN PATENT DOCUMENTS

JP 61-190429 8/1986

(Continued)

OTHER PUBLICATIONS

Translation of JP 19860825, Kokai 61190429, "Method of Displaying Content of Carrier Goods" by Sadao Shirakura.*

(Continued)

*Primary Examiner* — Jeffrey A Shapiro
(74) *Attorney, Agent, or Firm* — Wenderoth, Lind & Ponack, LLP

(57) ABSTRACT

A writing device for display members is provided which can erasably writing patient information on a display member carried on the side of a drug carrier and automatically attach and detach it to and from the carrier. The writing device has an attach/detach/transfer unit for detaching, attaching and transferring a rewrite card to a carrier carrying the rewrite card, and a writing means connected to the attach/detach/transfer means for writing and displaying patient information on the rewrite card. The respective means are controlled based on prescription information to attach and detach the rewrite card to and from the side of the carrier.

13 Claims, 13 Drawing Sheets

U.S. PATENT DOCUMENTS

| | | | | |
|---|---|---|---|---|
| 6,616,189 | B2 | 9/2003 | Raming | |
| 6,652,086 | B1 * | 11/2003 | Tomida et al. | 347/101 |

FOREIGN PATENT DOCUMENTS

| | | | |
|---|---|---|---|
| JP | 4-35848 | | 2/1992 |
| JP | 7-81737 | | 3/1995 |
| JP | 8-91382 | | 4/1996 |
| JP | 8091382 | | 4/1996 |
| JP | 8091382 | A * | 4/1996 |
| JP | 8-131519 | | 5/1996 |
| JP | 9-24968 | | 1/1997 |
| JP | 9-51922 | | 2/1997 |
| JP | 9-188332 | | 7/1997 |
| JP | 10-198736 | | 7/1998 |
| JP | 11-130080 | | 5/1999 |
| JP | 11-277777 | | 10/1999 |
| JP | 11-348997 | | 12/1999 |

OTHER PUBLICATIONS

Japanese Office Action (in English language) issued Jan. 13, 2005.
Japanese Office Action (in English language) issued May 16, 2005.

* cited by examiner

FIG. 8

〈prescription data〉

| | | | | | |
|---|---|---|---|---|---|
| patient No. | 98023451 | | outpatient/ admission code | 2 | (admission) |
| patient Name (Kana) | Taro Yamada | | voucher No. | | |
| patient Name (Kanji) | 山田 太郎 | | department code | 01 | |
| sex | 1 (man) | | department name | internal | |
| birth date | 3 (Showa) | 23.01.23 | doctor code | 0102 | |
| age | 052.07 | | doctor name | Hanako Kawakami | |
| prescription date | 2000.09.04 | | ward code | 60 | |
| preparation date | 2000.09.05 | | ward name | 6th floor | |
| execution date | 2000.09.06 | | room No. | 602 | |
| hospital code | 0287 | (Osaka Hospital | prescription code | 05 | (injection) |

| prescription No. | code | drug No. | dose | | kind | cool place |
|---|---|---|---|---|---|---|
| 1 | チユエ | ample A | 2A | | ample | |
| 1 | チユヒ | ample B | 1V | | ample | cool |
| 1 | /101 | once morning | | | | |
| 1 | *02 | 〈drip〉 | | | | |

FIG. 9

〈prescription data〉

| | | | | | |
|---|---|---|---|---|---|
| patient No. | 99012341 | | outpatient/ admission code | 1 | (outpatient) |
| patient Name (Kana) | Shinichi Yonemura | | voucher No. | 0075 | |
| patient Name (Kanji) | 米村 進一 | | department code | 01 | |
| sex | 1 (man) | | department name | internal | |
| birth date | 3 (Showa) | 25.06.07 | doctor code | 0108 | |
| age | 050.02 | | doctor name | Asami Takahashi | |
| prescription date | 2000.09.05 | | ward code | | |
| preparation date | 2000.09.05 | | ward name | | |
| execution date | | | room No. | | |
| hospital code | 0287 | (Osaka Hospital | prescription code | 01 | (outpatient) |

| prescription No. | code | drug No. | dose | dose/day | kind | cool place |
|---|---|---|---|---|---|---|
| 1 | シヨウエ | tablet A | | 3 capsules | capsule | |
| 1 | カフセヒ | capsule | | 6 CAP | capsule | |
| 1 | サンシ | powdered drug C | | 3 g | powdered drug | |
| 1 | /301 | after morning lunch dinner | | 7 days | | |
| | | | | | | |

FIG. 10A

Date: September 6 sixth floor internal
Room No. 602
Taro Yamada
〈To be stored at cool place〉

FIG. 10B internal
Voucher No. 0075
Shinichi Yonemura
〈tablet〉 〈powdered drug〉

WRITING DEVICE FOR DISPLAY MEMBERS ON DRUG CARRIER

Matter enclosed in heavy brackets [ ] appears in the original patent but forms no part of this reissue specification; matter printed in italics indicates the additions made by reissue.

*This application is a reissue application of U.S. Pat. No. 6,701,218, issued Mar. 2, 2004.*

BACKGROUND OF THE INVENTION

This invention relates to a writing device for erasably rewriting the display contents on a display member provided on a drug carrier.

In a medical facility such as a hospital or a pharmacy, large-scale mechanization is being done to efficiently prepare and collect drugs such as medicines and medical materials for each patient according to the instructions on prescription in a short time. For example, a system is embodied in which a plurality of injection drug dispensers for dispensing a large number of and various kinds of and ampules for injection are installed in a predetermined order, and different kinds of injection ampules are dispensed from the dispensers and put into carriers, and the carriers are transported through a conveyor provided along these dispensers to send them to an inspecting station to supply them to each patient through strict inspection.

As another example of the system for collecting drugs in carriers for transportation, a drug transportation device in which a conveyor device is provided along packaging devices for powder drugs and tablets and the drugs prepared are collected in carriers and sent to an inspecting station is known from Japanese patent publication 7-81737. In this device, an IC card for storing information is built in a carrier, and information stored is displayed in a liquid crystal display provided on the carrier, or the information is read in a non-contact manner to display the information on display devices of various drug preparation units.

In such a system including injection drug dispensing devices or drug preparation/transportion devices, prescription information about the contents of a carrier is printed on a sheet of paper and the sheet is put into it, such information as a patient name or voucher number corresponding to a carrier is printed on a name tab or an adhesive label and it is manually stuck on the side of the carrier so that they can be accurately handed to patients. As examples in which display of the contents of carriers or containers or display showing the correlation is done in technical fields other than medical field in which drugs are collected and carried, the following are known.

In Japanese patent publication 4-35848, there are disclosed a method and a device for controlling, using a production control device, a device for treating articles such as semiconductor products such as wafers by means of a memory media such as IC cards. This control method includes steps of tallying data on articles stored in an IC card detachably mounted on a container of the articles to be treated with data about treatment of the articles stored in the control device beforehand, dismounting the IC card, transferring the articles to be treated to a container for treatment and carrying out predetermined treatment, transferring the articles into the original container, fitting an IC card corresponding to the articles on this container, and writing the data about the treatment carried out into the IC card.

In Japanese patent publication 8-91382, using a card that needs no adhesive or an adhesive label, the card mounted on a container is automatically dismounted to improve workability. With a container being fed on a conveyor line having its position restricted in the width direction by guides, a dismounting lever is inserted into a space at rear of a card mounted on the side of the container to dismount the card.

Japanese patent publication 9-249689 discloses a device in which a pocket for receiving a data carrier as an information storing means is provided in a side plate of the cassette for carrying articles and the data carrier is mounted and dismounted to and from the cassette. In washing the cassette on which the data carrier is to be mounted, in order to avoid any bad influence on the data carrier, the latter is dismounted from the cassette, and after washing the cassette, it is re-mounted and information is written into the data carrier.

In medical facilities, drugs, medical materials, etc. are often received in carriers (generally called trays) separately for respective patients based on prescriptions and instructions by doctors. In order to hand drugs and the like stored therein correctly to patients, it is necessary to display at least such information as patient names or voucher numbers corresponding to the contents of carriers. For such requirements, the one in which an IC card or a display is provided on a carrier is of a type suitable for handling carriers almost fully automatically not manually. Thus, although the contents are displayed on the display, patient names or the like are not displayed. Also, general carriers other than those described above are mere containers and, of course, have no displays for patient names or the like.

Thus, in order that they can be used to display information on patient names or the like for any of the types, in medical facilities, such information is printed on name tags or adhesive labels, and before the carriers are used, they are manually stuck on the sides of the carriers and manually removed after use. But the work of manually sticking and unsticking display labels will be a large burden if the number of patients is large, and human error is inevitable. Also, adhesive labels may come off. After unsticking, glue will remain, so that the surface is stained. Further, since adhesive labels are disposed after use, the running cost is high.

Thus, carriers having the function of displaying, using not expensive members such as displays by IC cards but inexpensive members are desired.

By the way, display members that meet the above requirements, and printers which can write desired display contents on such display members are already commercially available. The display members allow display contents such as letters to be repeatedly written and erased. The printers can write display contents on the display members or erase them by applying a predetermined temperature. Using such a display member and printer, desired display contents are displayed on the display member and the display member is fitted on a carrier for drugs as described above. Since the display member can be used repeatedly, the running cost is lower than with an adhesive label and it is possible to prevent soiling of the carrier. But the display member has to be still manually fitted on a carrier, so that the burden of mounting and dismounting work remains. There is also the possibility of human errors.

An object of the present invention is to provide a writing device for carrier display members in which, using inexpensive display members which allow repeated writing and erasing, they are detachably attached to carriers, and in which information on patient names can be writably and erasably written on the display members, while preventing soiling of the carriers, achieving mechanization of work, and improving work efficiency.

SUMMARY OF THE INVENTION

According to this invention, there is provided a writing device for display members for a carrier comprising an attach/detach/transfer means for detaching, attaching and transferring a display member to the carrier detachably carrying the display member on one side thereof, and a writing means connected to the attach/detach/transfer means for erasably writing and displaying patient information on the display member, the attach/detach/transfer means and the writing means being controlled based on drug information in prescriptions, thereby attaching and detaching the display member to and from the carrier and writing patient information on the display member.

This writing device is used to attach a display member to the side of a carrier used to carry drugs automatically or manually in a hospital or a pharmacy and erasably display patient information on it. By displaying patient information, it will help correctly handing drugs to patients or distributing them in a hospital.

The writing means for repeatedly erasing and writing display contents on the display member is generally used by inserting the display member manually through its insert port to rewrite the display contents. But in view of hygienic control and efficiency of drug preparation work in hospitals, it is desirable to attach the display member not manually but mechanically. Thus, the attach/detach/transfer means is provided at a predetermined position.

When the carrier is placed at the predetermined position so that its side contacts the attach/detach/transfer means, the display member carried on the side is dismounted, transferred and fed into the writing device. Patient information based on drug information on prescriptions is written on the display member by the writing means. The display member is then returned and fitted on the side of the carrier. Since the display member allows erasing and writing to be repeated a plurality of times, it is not discarded after one-time use but can be used several hundred times. Thus, the cost is low and fitting can be done efficiently.

Other features and objects of the present invention will become apparent from the following description made with reference to the accompanying drawings, in which:

BRIEF DESCRIPTION OF THE DRAWINGS

FIG. 8 is a view showing an example of prescription data for an ampule dispensing device;

FIG. 9 is a view showing an example of prescription data for a drug conveyor device;

FIGS. 10A and 10B are views showing examples of patient information on a rewrite card;

DETAILED DESCRIPTION OF THE PREFERRED EMBODIMENT

Figure 1:
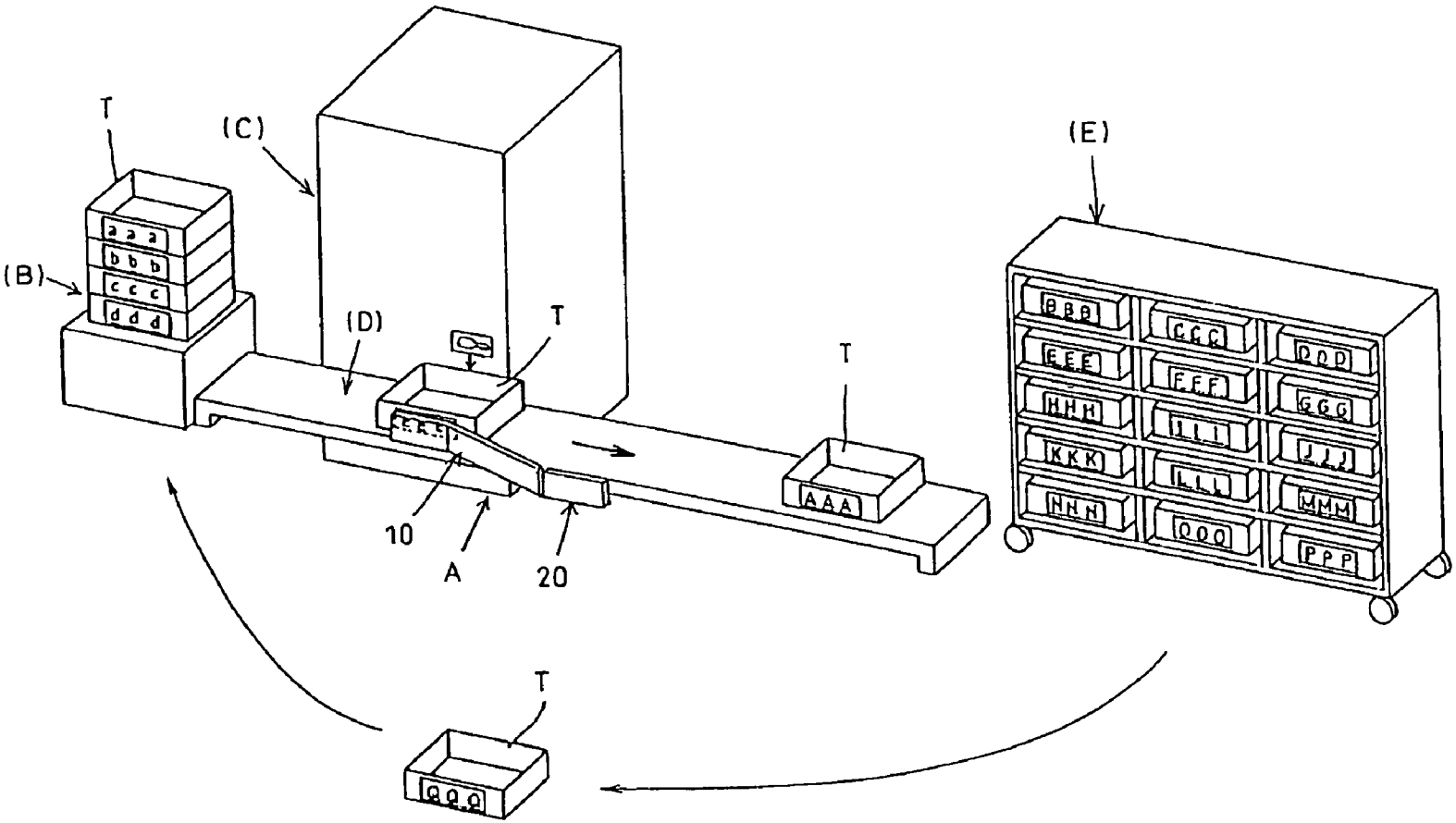
FIG. 1 is a schematic view of the entire ampule dispensing device provided with a writing device for display members of an embodiment.

Hereinbelow, referring to the drawings, the embodiments will be described. FIG. 1 shows an entire schematic view of the ampule dispensing device having a conveyor device with a writing device for carrier display members of the embodiment. In the illustrated ampule dispensing device, ampules dispensed from a central ampule dispensing machine (C) are dispensed into carriers T supplied from a carrier supply device (B) provided at the starting end of the conveyor device (D). After the carriers T have been carried to the terminal end of the conveyor device (D), they are fed into a carrier-discharge lifter cart (E). In the cart, the carriers T are stacked for each of a plurality of columns. After carriers equal in number to the number of patients have been temporarily collected, the cart is moved to a pharmacy, a ward nurse station, etc.

The illustrated conveyor device (D) has at a suitable position in front of the ampule dispensing machine (C) a card attachable/detachable writing device A for erasing and writing patient information on a card (that is, patient information display member) carried on the side of a carrier T and adapted to display patient information (patient name, date, ward name, room number, department, existence or nonexistence of drugs to be stored in a cold place) about the patient for whom the drugs stored in the carrier are intended. The card is generally called a rewrite card and has characteristics that patient information written and displayed is erasable and information on another patient can be rewritten.

In the illustrated example, the rewrite cards 1 are of substantially the same dimensions and thickness as generally used telephone cards and commuter passes. Generally, two kinds of rewrite cards are known, i.e. leuco type cards in which a leuco dye and a developer in a recording layer react and are bound together to develop color, and a clouding type of rewrite cards in which a gap is produced between the low molecules and resin of the recording layer and looks white. Either of the rewrite cards are of a type in which when a specific temperature is applied, it is possible to write or erase letters. In the embodiments, the former leuco type cards are used.

FIGS. 2-5 show the schematic structure of the writing device (A). It has a card transfer means 10 for pulling a rewrite card 1 out of a card-retaining member 2 at the side of a carrier T and inserting back into it, and a writing means 20 for writing patient information into each rewrite card 1 fed into it by the card transfer means 10. The card transfer means 10 has rubber rollers 12 that rotate about vertical shafts, rotary plastic rollers 13 arranged opposite to the rollers 12 with a predetermined clearance (which corresponds to the thickness of the cards). These rollers 12, 13 are arranged in a plurality of pairs at predetermined intervals, and a guide frame 11 having a hollow, rectangular sectional shape is provided to support the roller pairs.

The guide frame 11 has a vertical width slightly larger than the longitudinal width of the rewrite cards and has a thickness of several centimeters. The entire frame is integrally formed such that its abutting portion 11a having a length of about ⅓ of the total length near the rewrite card 1 held by the card-holding member 2 of the carrier and its remaining guide portion 11b having a length of about ⅔ are bent at a moderate angle. Also, the guide frame 11 is provided so as to be rotatable about a vertical shaft 14 provided at the guide portion 11b at a position near the writing member 20 so that the rubber rollers 12 on one side of the abutting portion 11a can abut the rewrite card 1. The vertical shaft 14 is fixed to a base plate 10B provided on a rail frame of the conveyor (D).

Figure 4A:
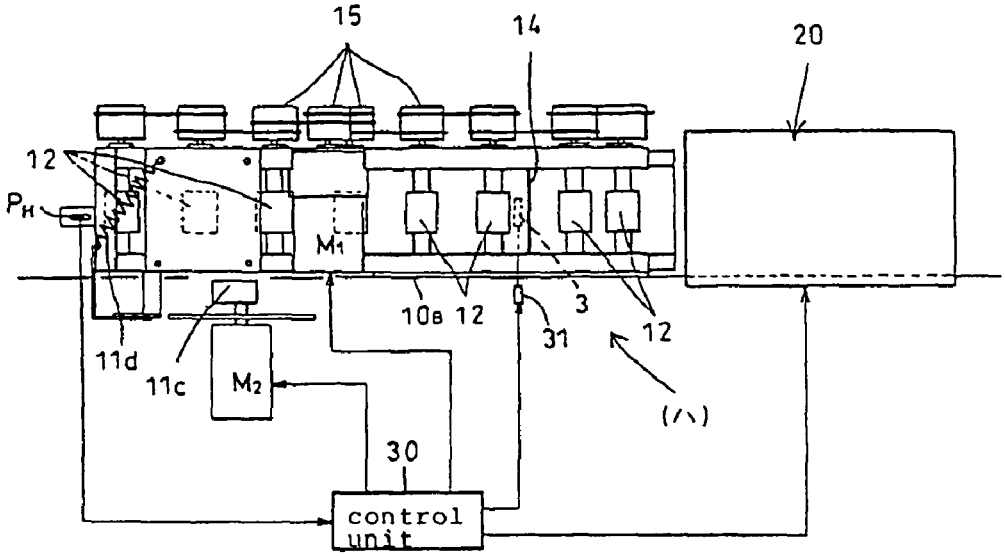
FIGS. 4A and 4B are a side view and a plan view of the card attach/detach means, respectively.
Figure 4B:
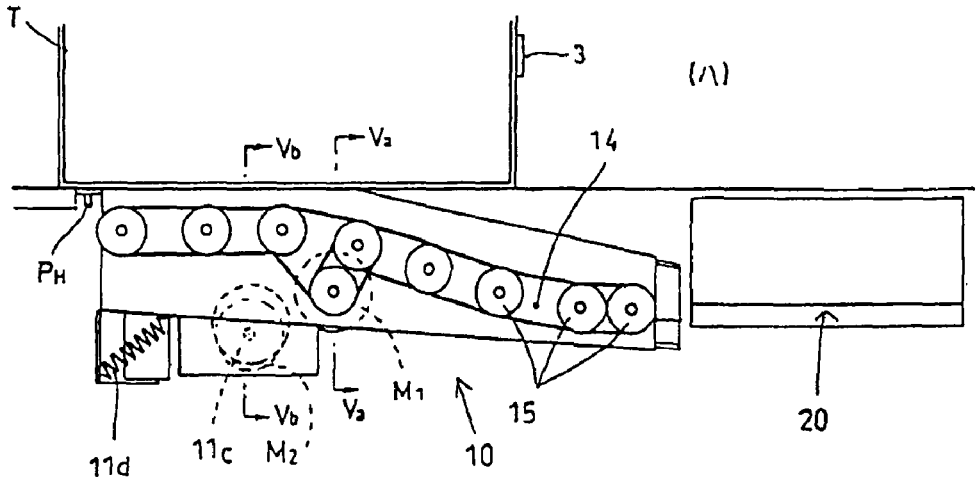

As shown in FIGS. 4A and 4B, inside the bent portion, a small motor M1 is built in with its output shaft provided with a small pulley 15 provided at the end protruding from an upper frame plate and the same pulleys 15 are provided at protruding ends of the rotary shafts of the respective rubber rollers 12. A Belt is wound around these pulleys 15 so that the power of the motor M1 can be transmitted.

Figure 3:
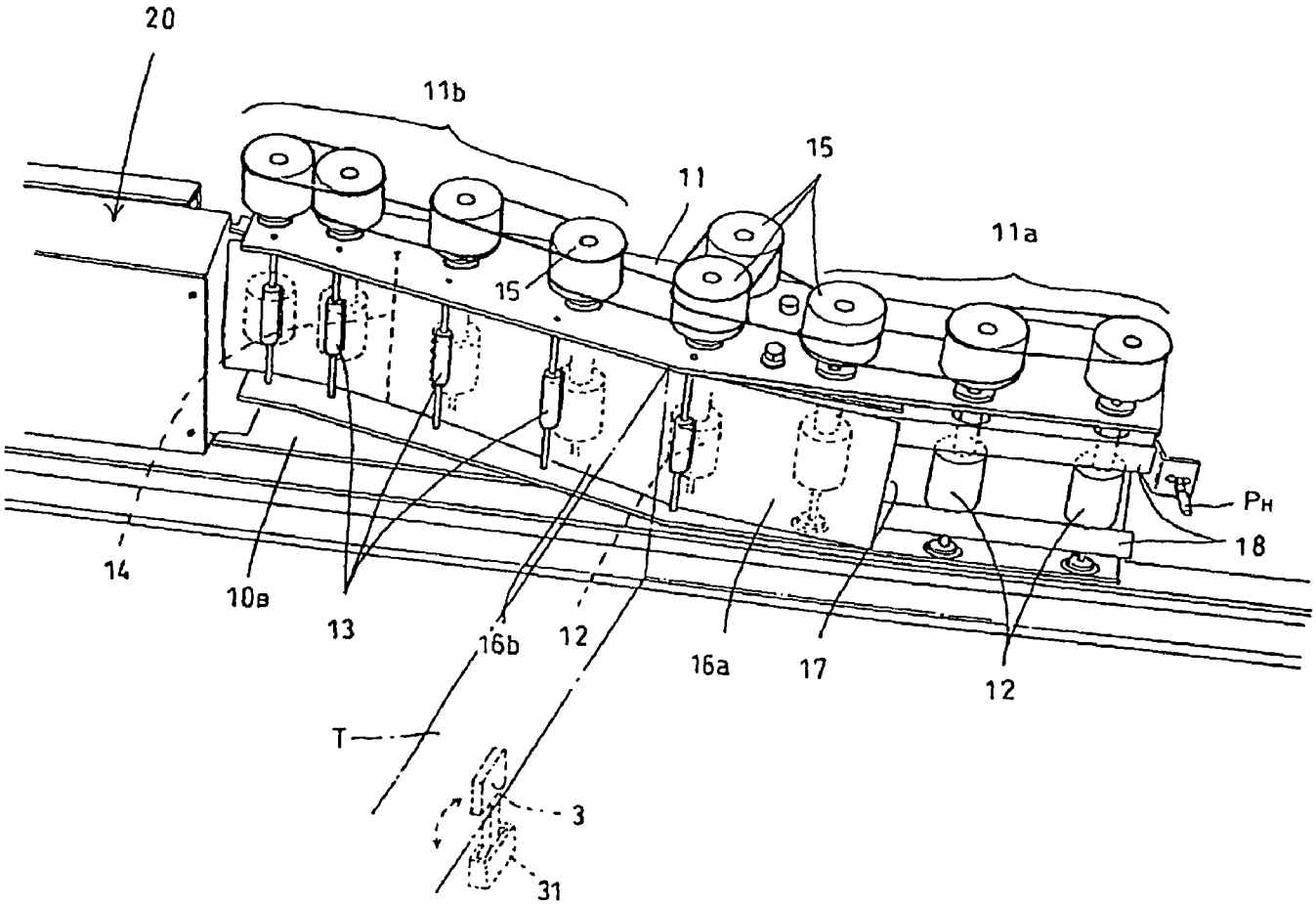
FIG. 3 is a perspective view as seen from the arrow III of FIG. 2.

As shown in FIG. 3, at the abutting surface with the rewrite card 1 of the abutting portion 11a of the guide frame 11, a frame plate 16a continuing to a frame plate 16b of the guide portion 11b is cut to about half the length of the abutting portion 11a. At the remaining half portion, two of the rubber rollers 12 are exposed. The frame plate 16a is slightly open outwardly to provide a gap between it and the surfaces of the rubber rollers 12 so that rewrite cards 1 can be easily received. Over and under the rubber rollers 12, two parallel guide plates 18 are provided horizontally over the entire length of the guide frame 11.

Figure 5B:
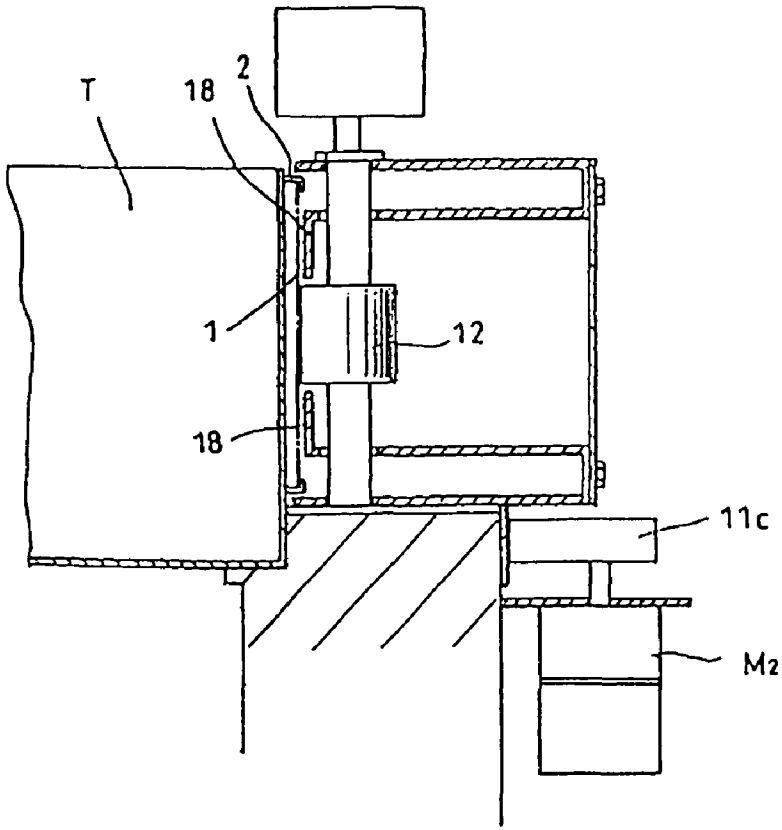
FIGS. 5A and 5B are sectional views taken along lines Va-Va and Vb-Vb of FIG. 4B.
Figure 5A:
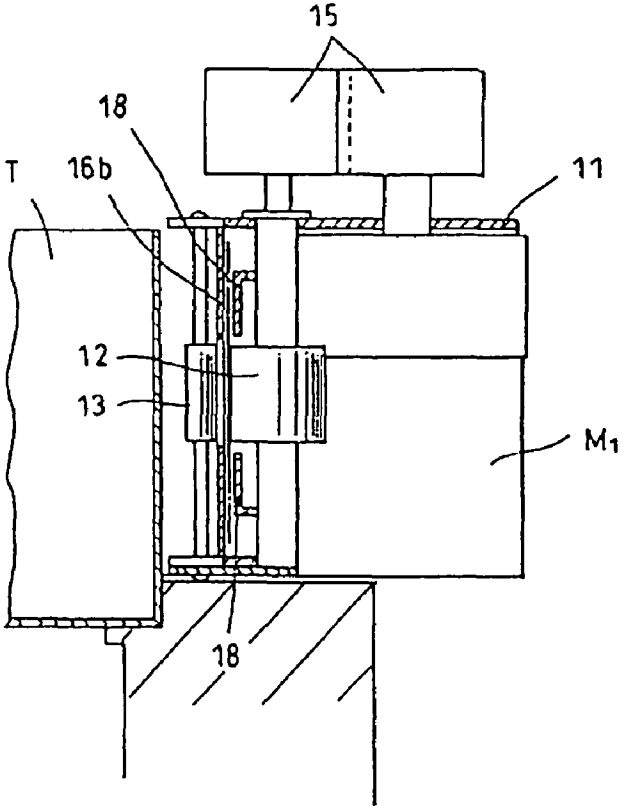

Also as shown in FIG. 5, at a suitable position at a lower outer side of the abutting portion 11a of the guide frame 11, an eccentric cam roller 11c is connected to the output shaft of a motor M2 provided under the base plate 10B. When the cam roller 11c abuts the lower outer side of the abutting portion 11a, the guide frame 11 turns by a slight angle so that the rubber rollers 12 exposed from the guide frame will abut a rewrite card 1. The guide frame 11 is normally biassed by a coil spring lid provided between the base plate 10B and the end of the guide frame such that the abutting surface 11a is pulled out of the rail frame.

On the base plate 10B, a position sensor PH (FIG. 4A) is provided adjacent the end of the guide frame 11. Carriers T are detected by the sensor PH whose signal is fed to a control unit 30. The control signal from the control unit 30 is fed to a drive unit 31B of a stopper 31, which is a carrier stop/release means, to protrude the stopper 31 to forcibly stop the carriers T. The stopper 31 is provided inside the conveyor device (D) and normally below the bottom of each carrier T, and rises so as to abut the bottom of a carrier by the control signal to forcibly stop the movement of the carrier.

Figure 2:
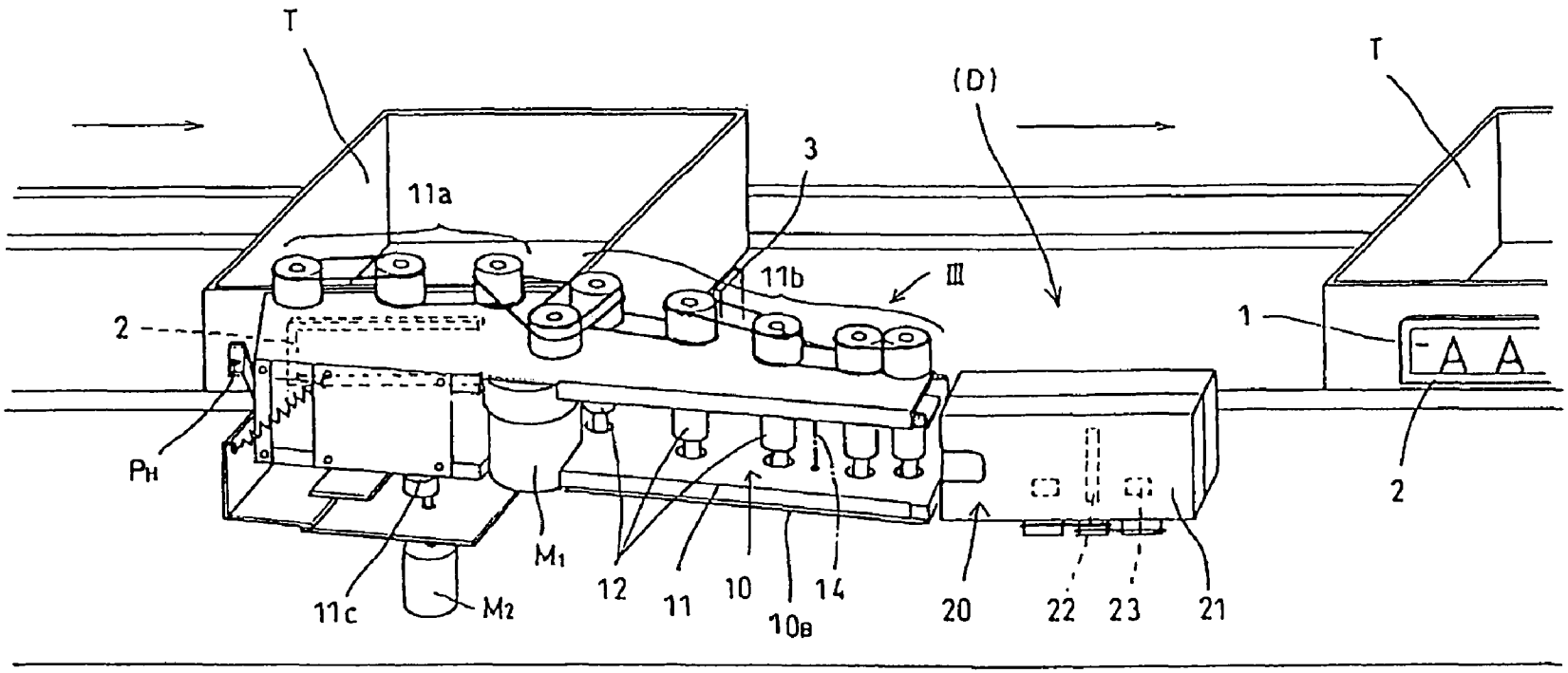
FIG. 2 is an enlarged perspective view of the writing device of the same.

As shown in FIG. 2, the writing means 20 has a thermal head 22 provided in one of the case halves of a split case 21. When a rewrite card 1 fed into the case between the two case halves from one end (left-hand side in FIG. 2) of the case is moved by feed rollers 23 and passes the thermal head 22, a predetermined temperature is applied by the thermal head 22 to write. But since this is already known, detailed description is omitted. With this writing means 20, even if previous patient information is written on the rewrite card, the display is erased and new patient information is written. This operation can be carried out repeatedly. (But there is a practical limit of rewriting, about several hundred times.)

Figure 6:
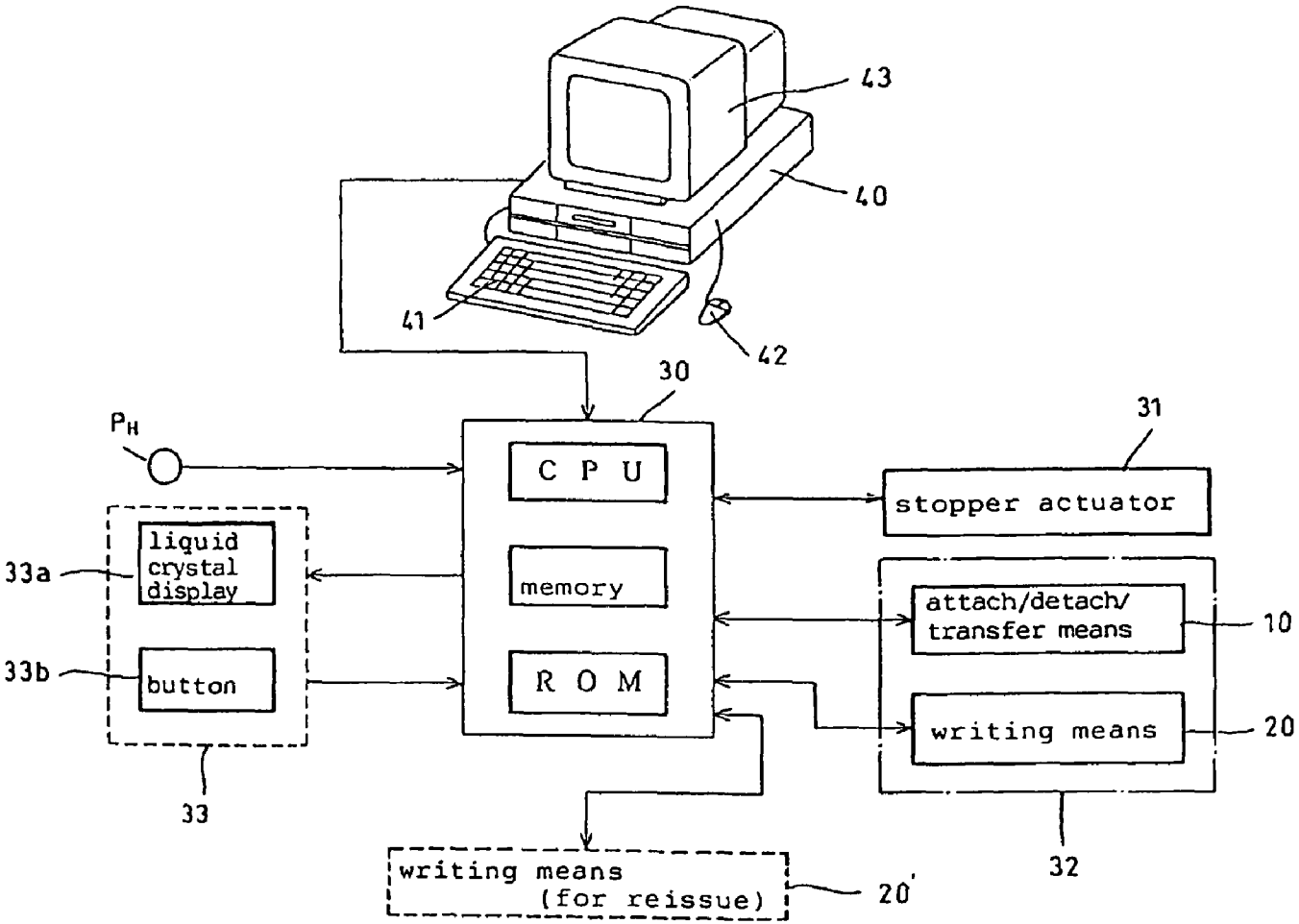
FIG. 6 is a block diagram of a control system of a first embodiment of a writing device for display members.

FIG. 6 shows a schematic block diagram of the control system of the first embodiment. But the means shown by dotted line is provided in the second embodiment and will be described later. As shown, a host computer 40, which is a drug information transmitter, is connected to the control unit 30. From the host computer 40, prescription data for patients are transmitted. Specific examples of the prescription data will be described later. The control unit 30 controls a card attach/detach/write means 32, which comprises the card attach/detach/transfer means 10 and the writing means 20, based on the prescription data. It also controls the stopper 31, which is a carrier stop/release means, based on the detection signal from the position sensor PH. 41 is a keyboard as an input means of the host computer 40, 42 is a mouse, and 43 is a display (CRT).

Figure 7:
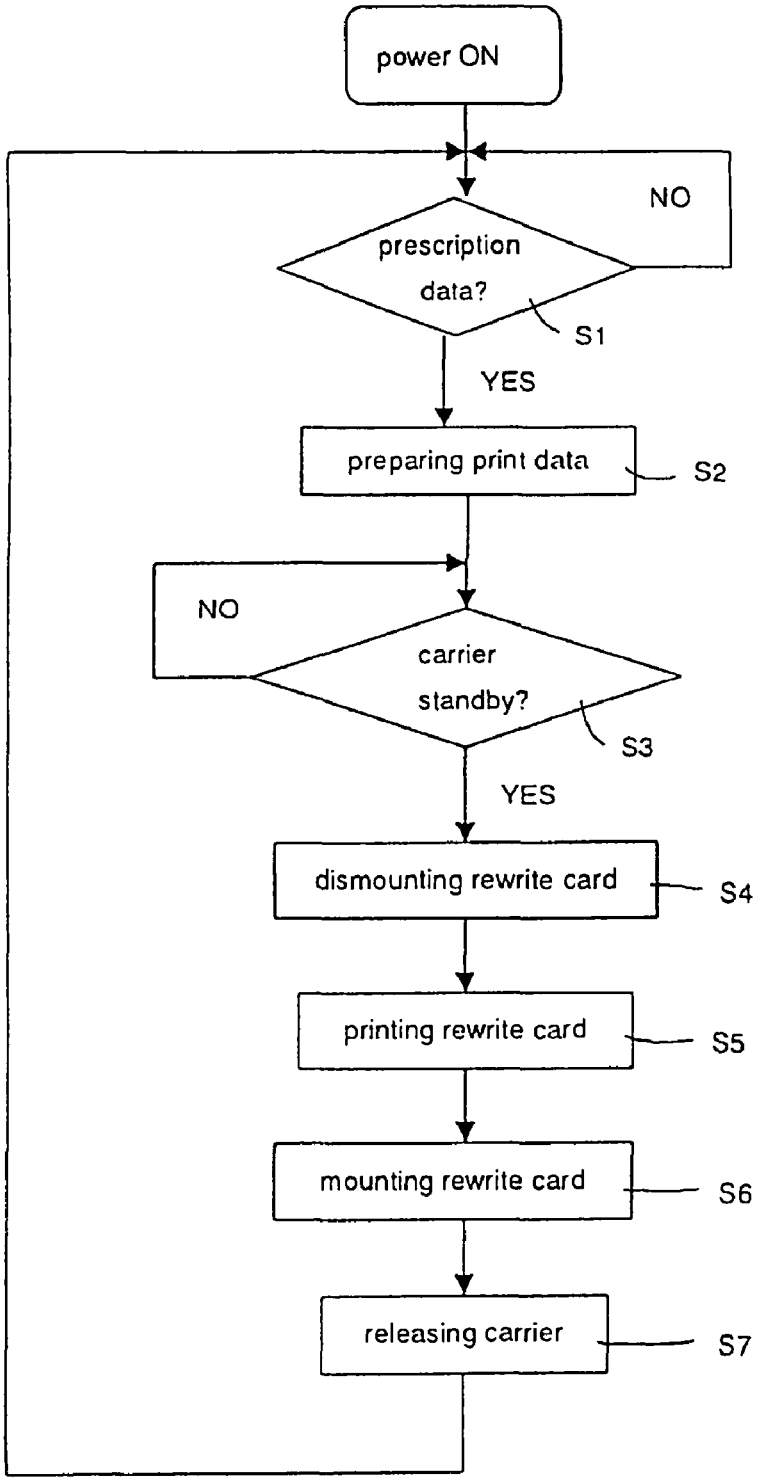
FIG. 7 is a flowchart of the process by the control system of the first embodiment.

FIG. 7 shows a flowchart of a process performed by the control unit 30 of the first embodiment (with no reissue function). In the process having no function of reissuing rewrite cards, when the power to the entire control system is turned on, the illustrated process starts immediately. In step S1, the transmission of the prescription data from the host computer 40 is confirmed and if there is no transmission of prescription data, it will return to the top. If the prescription data are received, it proceeds to S2.

In S2, printing data for rewrite cards are prepared from the prescription data. For example, if the host computer 40 is a computer for controlling an ampule dispensing device, from among the prescription data shown in FIG. 8, data necessary for print contents shown in FIG. 10A are read to prepare printing data. If the host computer is for a drug conveyor device for carrying tablets instead of the ampule dispensing device, from among the prescription data shown in FIG. 9, data necessary for printing contents of FIG. 10B are read to prepare printing data. To the printing data prepared, serial numbers are assigned and they are controlled by a memory of the control unit 30.

In the case of the prescription data of the ampule dispensing device of FIG. 8, items of printing contents include patient name, date, ward number, room number, department, existence or nonexistence of drugs to be stored in cool place. The last item is particularly useful. If there is any drug to be stored in a cool place, the display of "drugs to be stored in cool place" is printed on the card based on the data of "cool" in the cool place column. Also, in the case of the prescription data of the drug conveyor device of FIG. 9, items of printing contents include patient name, voucher number, department, and kinds of drugs. The indication of the last item is especially useful. From the data in the drug kind column, indication of tablets or powdered drug is printed.

In S3, it is confirmed on whether or not a carrier is stopping at a correct position. Stoppage of a carrier is carried out, as described above, by activating the stopper 31 based on the signal from the position sensor PH. When the sensor PH transmits a detection signal and the stopper 31 is activated, it is determined that a carrier T has stopped at a predetermined position and it proceeds to the next step S4.

In S4, a rewrite card 1 is dismounted from a carrier T. The dismounting is carried out as follows. When a control signal is first transmitted to the motor M2 of the card attach/detach/transfer means 10 from the control unit 30, the cam roller 11c rotates to slightly turn the guide frame 11, thereby bringing the abutting portion 11a into abutment with a rewrite card 1 of a carrier T. At the same time, the control signal is also transmitted to the motor M1 to rotate the rubber rollers 12 to prepare for the feeding of the rewrite card 1. When the rubber rollers 12 at the abutting portion 11a contact the rewrite card 1, due to frictional force, the rewrite card 1 is fed from the card-holding member 2, passes through the gap 17 between it and the frame plate 16a of the guide frame 11 and the gap between the rubber rollers 12 and the plastic rollers 13 and is fed to the writing means 20.

In S5, printing on the rewrite card 1 is done by the writing means 20. When the rewrite card 1 is fed into the writing means 20, the rewrite card 1 is treated by the thermal head to print (erase+print) the data. When printing is over, in S6, the rewrite card 1 is fed back to the card attach/detach/transfer means 10, fed in the guide frame 11 and fitted in the card-holding member 2 of the carrier. In S7, the stopper 31 is lowered to release the carrier, which is transferred by the conveyor device (D). After release of the carrier, it returns before step S1, and the above process is carried out for the next carrier. This process is repeated one after another.

The writing device for the carrier display member of the second embodiment has a writing means 20' (for reissue) shown by dotted line in FIG. 6, and an operating means 33 having a liquid crystal display 33a and a button 33b, and has the function of reissuing rewrite cards. The writing means 20' for reissue is provided as a separate means at a completely separate position (not shown) so as not to influence the continuous operation of the card attach/detach/write portion 32. Reissued rewrite cards are manually replaced with a rewrite card mounted on a carrier. Reissue of rewrite cards is an operation carried out if printing by the writing means 20 is unclear. If the function of the operating means 33 can be carried out by the host computer 40, the operating means 33 and writing means 20' can be omitted.

Figure 11:
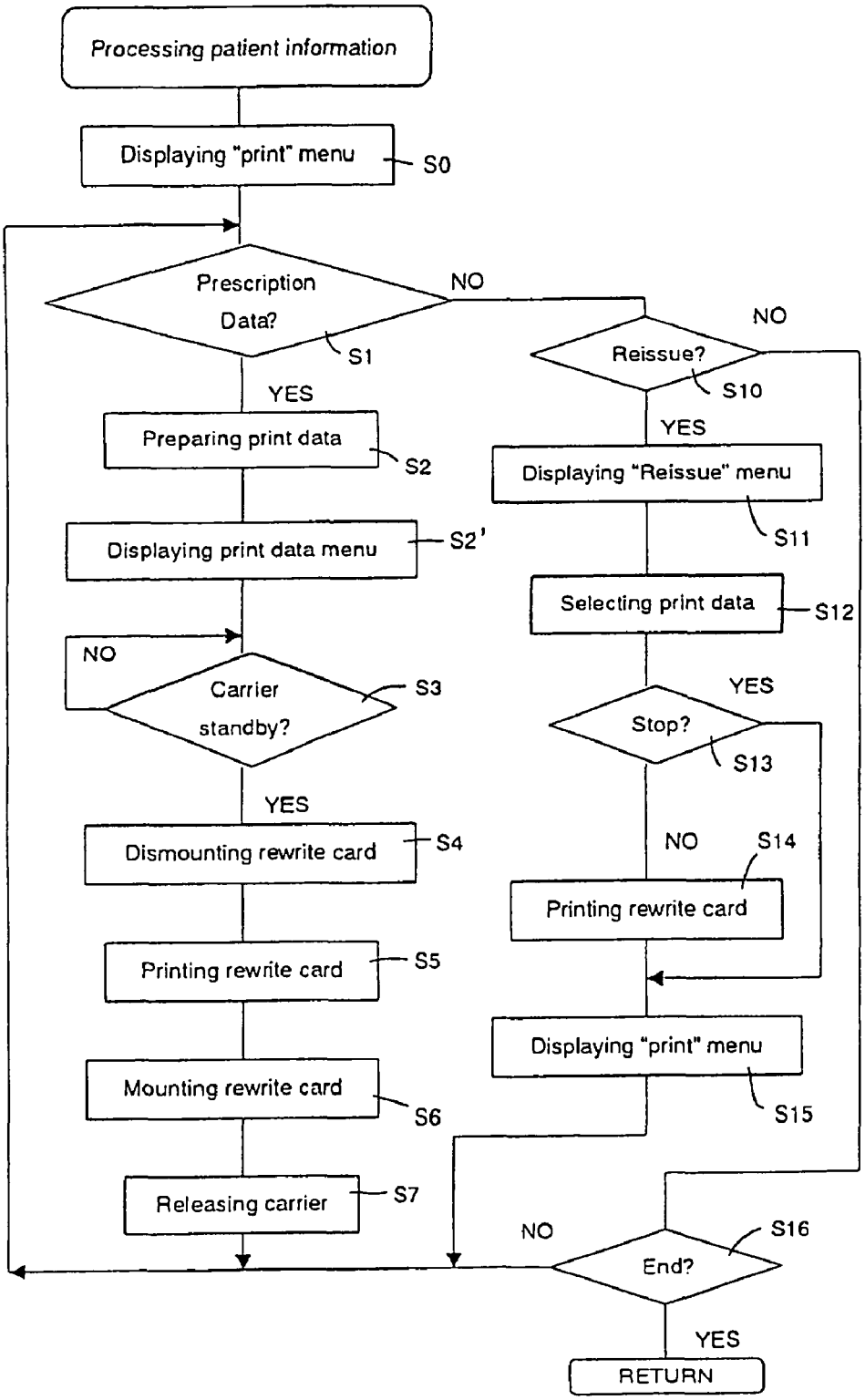
FIG. 11 is a flowchart of the process by the control system of the second embodiment.
Figure 12A:
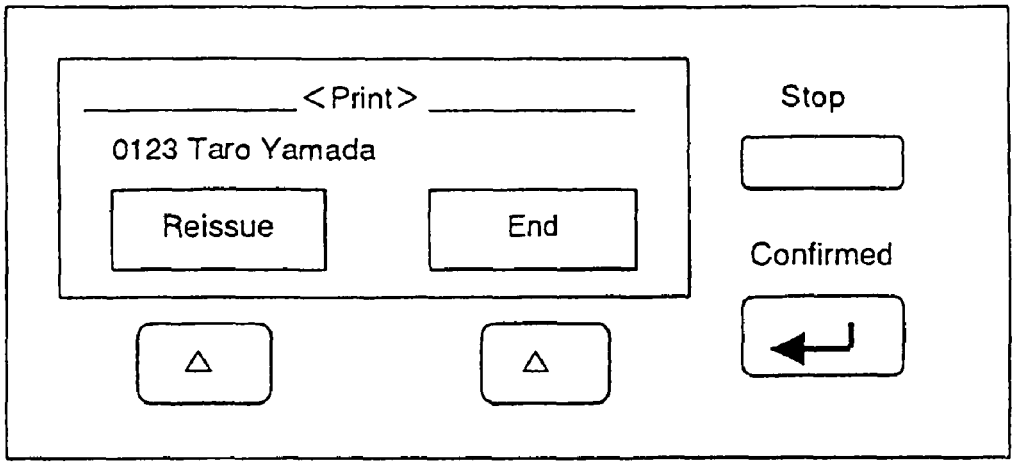
FIGS. 12A and 12B are explanatory views of printing/reissue screens of the same.
Figure 13:
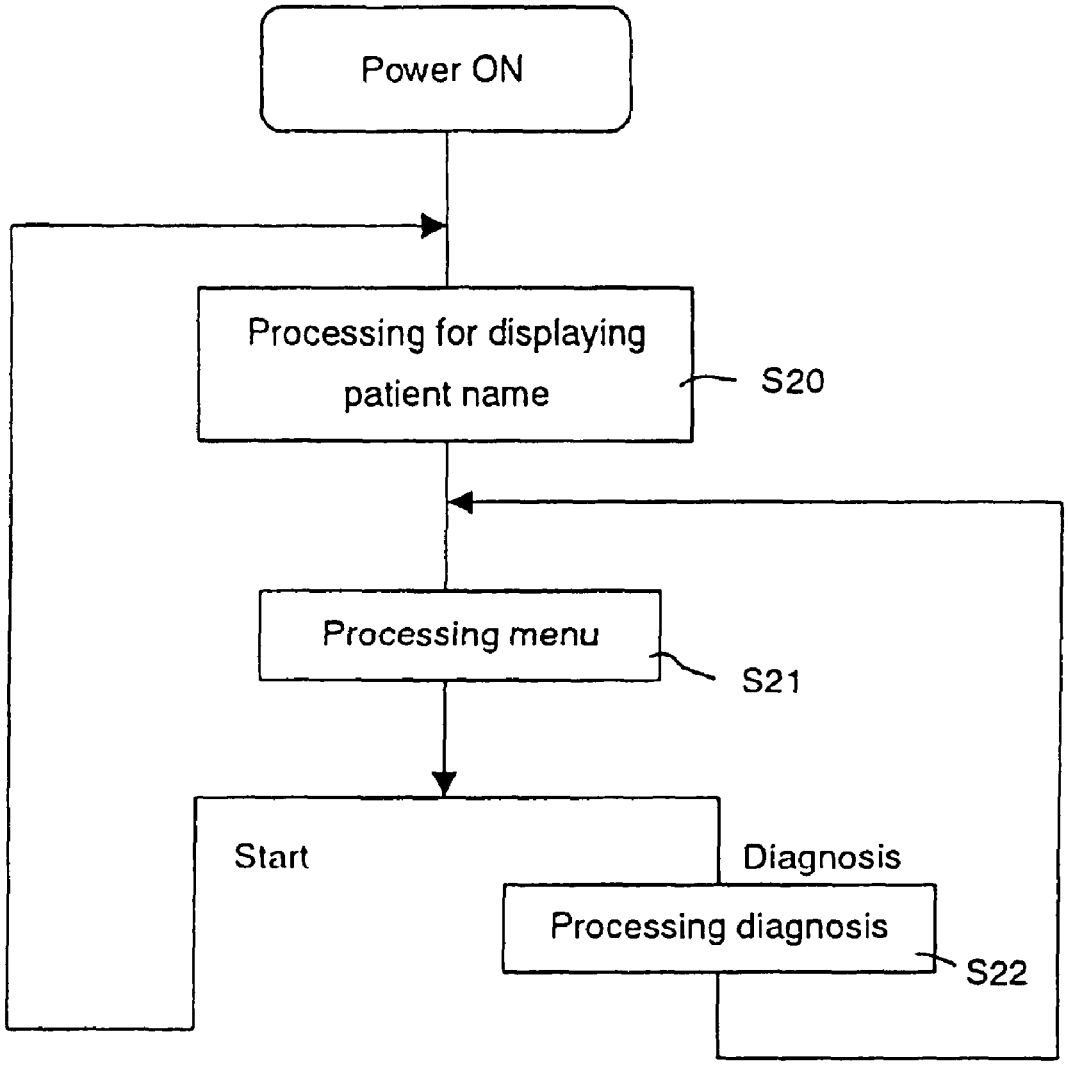
FIG. 13 is an explanatory view of the processing of a menu screen.

FIG. 11 shows a flowchart of the process carried out by the writing device of the second embodiment. For the main functions performed by the card attach/detach/write portion 32, this embodiment is almost the same as the first embodiment. But it differs from the first embodiment in that since the operating means 33 is provided, screen display is carried out and that reissue of rewrite card is possible. Since the operating means 33 is provided, when the power is turned on, the process of FIG. 11 is activated from the menu screen process of FIG. 13, and first in step S0, the screen of FIG. 12A is displayed on the liquid crystal display 33a. But since the prescription data are not yet received, in the initial screen, printing data of FIG. 12A are not displayed.

It is the same as in the first embodiment in that in S1, prescription data are received, and in S2, printing data are prepared. But when the print data are prepared, in S2', as in FIG. 12A, the serial number and patient name are displayed on the screen. On the display screen, selection buttons "reissue" and "end" are displayed. It is the same as the first embodiment in that unless the button switch "Δ" corresponding either of them is depressed, the processes of S3-S7 are done. When the process of S7 is over, it returns before S1 and the same process as above is executed for every display by sending prescription data for each patient.

By repeating these processes, ordinary writing into rewrite cards is done. But printing on written rewrite cards is sometimes unclear. This is because printing can become unclear if erasing and writing are repeated over the limit of several hundred times. If rewrite cards with unclear printing appear, an operator checks them visually and performs the reissue process. Since prescription data are not necessarily sent continuously while the processes of S1-S7 are being carried out, but there may be no transmission of prescription data for some time periods, such reissue processing is carried out during such periods.

Figure 12B:
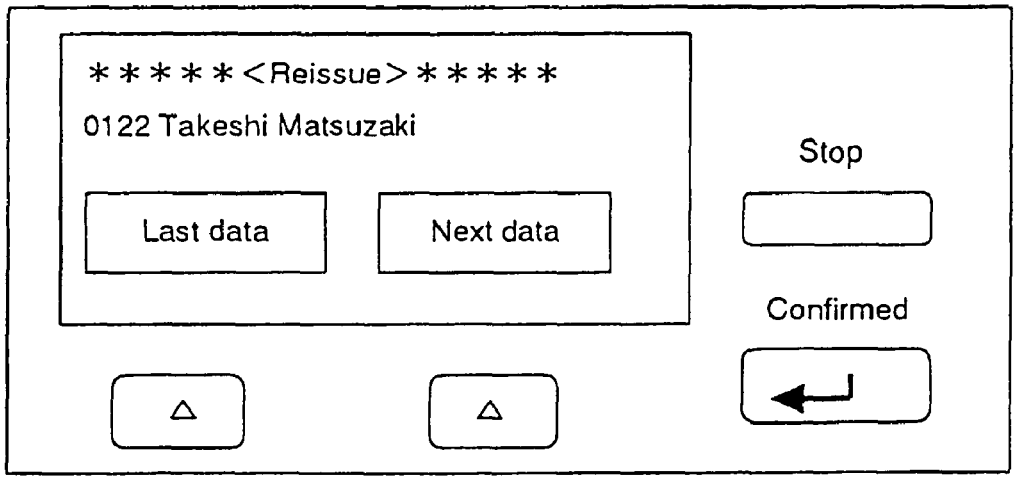

When the processing operation returns before S1, if the "reissue" button shown in FIG. 12A is pressed selecting the timing at which there is no transmission of prescription data, the processing treatment proceeds to the flow on the right-hand side of FIG. 11. Unless the "end" button is pressed in S10, it proceeds to S11 and the "reissue" screen shown in FIG. 12B is displayed. The "reissue" screen is for indicating the printing data to be reissued. The serial number and patient name of the printing data that have already been printed are displayed. When the "last data" button is pressed, the data before the data now displayed are displayed. When the "next a data" button is pressed, data next to the data now displayed are displayed.

After displaying the printing data he wants to reissue by pressing the "last data" or "next data" button, an operator presses a "determine" button to make selection of data. It proceeds to S13 and unless a "stop" button is pressed here, it proceeds to S14. When a spare rewrite card is put in the writing means 20' for reissuing, print data to be reissued are overwrite-printed (erase+print) on the rewrite card for reissuing. Rewrite card reissued on the writing means 20' are manually replaced with the rewrite card mounted on carriers.

If the "stop" button is pressed in S13, reissue process is stopped, the former printing screen shown in FIG. 12a is displayed in S15 and it returns before S1. If printing of rewrite cards is done in S14, the former printing screen is displayed in S15 and it returns before S1. On the other hand, if there is no transmission of prescription data, it proceeds to S10. Unless the "reissue" button is pressed there, it proceeds to S16. Unless the "end" button is pressed there, it returns before S1, and if the "end" button is pressed, it returns to the menu screen process shown in the flowchart of FIG. 13, so that the "menu screen" (not shown) is displayed (S21). On this "menu screen", a "start" button and a "diagnose" button are displayed. If the start button is pressed in S21, it returns before S20 to activate the process of FIG. 11. If the diagnose button is pressed, "diagnosis process" is carried out in S22.

For the diagnosis process, a diagnosis program for checking if the device-forming parts such as the control unit 30, card attach/detach/write portion 32, operating means 33 operate normally is provided in the control unit 30 (details are not shown). In this process, it is self-diagnosed whether the operation of each component is normal, at a suitable timing (generally at the end of everyday's drug processing) using this program. The diagnosis process in S22 is repeated after returning to S21. To return to the normal operation, by pressing the "start button", it returns to before S20 and the process of FIG. 11 is activated.

In the above two embodiments, the writing device A is attached to the conveyor device D. Carriers T may be transferred not by the conveyor device D but may be fed on a cart or manually. Thus, a table of a suitable height may be provided at a predetermined position (any place in a hospital or pharmacy will do) so that a carrier can be stably placed thereon, and the writing device A may be attached to the table, not to the conveyor device. By this arrangement, simply by placing a carrier T on the table, attaching and detaching of a rewrite card 1 and writing of printed letters are automatically processed by the writing device A.

In the embodiments, the rewrite card 1 on the side of each carrier T is of a type in which it is attached and detached to and from the carrier by being moved in a horizontal direction by the card attach/detach/transfer means 10. But attaching and detaching of cards may not be in a horizontal direction. For example, a card may be sucked and raised by a suction means having a suction arm, and fed into the writing means by moving or turning the suction arm.

As described above, with the writing device for carrier display members of this invention, the attach/detach/transfer means for detachably fitting a display member to a carrier is provided at a predetermined position, and the writing means for erasably writing patient information on each display member is connected, thereby patient information is repeatedly erased and written on a display member and the display member is attached to and detached from a carrier. Thus, attaching and detaching of display members to and from carriers are mechanized without the necessity to manually fit them. Also, soiling due to adhesive is prevented. Thus, it is hygienic, work efficiency improves, human errors can be prevented, and inexpensive display members can be used without needing expensive members such as IC cards or displays.

What is claimed is:

1. A writing device for display members for a carrier comprising an attach/detach/transfer means for detaching, attaching and transferring a *rewrite card type* display member to the carrier detachably carrying said display member on one side thereof, *said rewrite card type display member including a recording layer, wherein the rewrite card type display member is capable of displaying patient information upon application of a specific temperature to write or erase letters on the recording layer,* and a writing means connected to said attach/detach/transfer means [for erasably writing and displaying patient information on said display member,] *for writing patient information on the recording layer of the rewrite card type display member by applying the specific temperature with a thermal head, and erasing such information from the recording layer,* said attach/detach/transfer means and said writing means being controlled based on drug information in prescriptions, thereby attaching and detaching said display member to and from the carrier and writing patient information on said display member *such that the rewrite card type display member is attached to and detached from one carrier, and, after rewriting patient information on the recording layer with said writing means, the same rewrite card type display member is attached to the same carrier or a different carrier, and this cycle is repeated.*

2. A writing device for display members for a carrier [as claimed in claim 1] *comprising an attach/detach/transfer means for detaching, attaching and transferring a display member to the carrier detachably carrying the display member on one side thereof, and a writing means connected to said attach/detach/transfer means for erasably writing and displaying patient information on said display member, said attach/detach/transfer means and said writing means being controlled based on drug information in prescriptions, thereby attaching and detaching said display member to and from the carrier and writing patient information on said display member,* wherein said attach/detach/transfer means having a guide frame which forms a guide path portion in which a plurality of pairs of rubber rollers and opposed rollers are provided in said frame at predetermined intervals, and an abutting portion having rubber rollers exposed from said frame, said guide frame being rotatable, whereby said display member can be attached and detached to and from the carrier by bringing said rubber rollers at said abutting portion into contact with said display member of the carrier and rotating said rubber rollers.

3. A writing device for display members for a carrier as claimed in claim 1 wherein a carrier stop/release means is provided at a predetermined position of a path for feeding said carrier to stop said carrier and wherein at said predetermined position, said attach/detach/transfer means is provided.

4. A writing device for display members for a carrier as claimed in claim 1, further comprising a control unit connected to said attach/detach/transfer means and *said* writing means and a drug information transmitting portion connected to said control unit for storing drug information for each patient based on prescriptions, said control unit selecting patient information fed from said drug information transmitting portion and feeding it to said writing means to erase and write the patient information on said display member, which is attached and detached by said attach/detach/transfer means.

5. A writing device for display members for a carrier as claimed in claim 1, further comprising writing means for reissuing said display members and operation means having a display for displaying patient information and an input means for inputting operating signals, said operation means being connected to said writing means to reissue said display members.

6. A writing device for display members for a carrier as claimed in claim 2 wherein a carrier stop/release means is provided at a predetermined position of a path for feeding said carrier to stop said carrier and wherein at said predetermined position, said attach/detach/transfer means is provided.

7. A writing device for display members for a carrier as claimed in claim 2, further comprising a control unit connected to said attach/detach/transfer means and *said* writing means and a drug information transmitting portion connected to said control unit for storing drug information for each patient based on prescriptions, said control unit selecting patient information fed from said drug information transmitting portion and feeding it to said writing means to erase and write the patient information on said display member, which is attached and detached by said attach/detach/transfer means.

8. A writing device for display members for a carrier as claimed in claim 3, further comprising a control unit connected to said attach/detach/transfer means and *said* writing means and a drug information transmitting portion connected to said control unit for storing drug information for each patient based on prescriptions, said control unit selecting patient information fed from said drug information transmitting portion and feeding it to said writing means to erase and write the patient information on said display member, which is attached and detached by said attach/detach/transfer means.

9. A writing device for display members for a carrier as claimed in claim 2, further comprising writing means for reissuing said display members and operation means having a display for displaying patient information and an input means for inputting operating signals, said operation means being connected to said writing means to reissue said display members.

10. A writing device for display members for a carrier as claimed in claim 3, further comprising writing means for reissuing said display members and operation means having a display for displaying patient information and an input means for inputting operating signals, said operation means being connected to said writing means to reissue said display members.

11. A writing device for display members for a carrier as claimed in claim 4, further comprising writing means for reissuing said display members and operation means having a display for displaying patient information and an input means for inputting operating signals, said operation means being connected to said writing means to reissue said display members.

*12. A drug dispensing device comprising:*

*a carrier supply device including a plurality of drug carriers;*

*a transport device for transporting said carriers from said carrier supply device;*

*a dispensing machine for dispensing drugs into said carriers;*

*a plurality of rewrite card type display members detachably attached to said carriers, respectively, each of said rewrite card type display members including a recording layer,*

*wherein each of said rewrite card type display members is capable of displaying patient information upon application of a specific temperature to write or erase letters on the recording layer;*

*a writing means for repeatedly writing patient information on the recording layer of each of said rewrite card type display members by applying the specific temperature with a thermal head, and erasing such information from the recording layer;*

*a controller for controlling said dispensing machine to dispense drugs into said carriers based on drug information derived from prescriptions,*

*said controller being operable to control said writing means to erase old patient information from said rewrite card type display members attached to said carriers, and write new patient information on said rewrite card type display members;*

*a carrier-discharge lifter cart provided at a terminal end of said transport device, wherein the drugs dispensed into said carriers in accordance with prescription data can be collected into said carrier-discharge lifter cart, and each of the carriers is provided with one of the rewrite card type display members on which new patient information from prescription data has been written by said writing means, which is controlled by said control device; and*

*a card attach/detach/transfer means arranged along said transport device for attaching said rewrite card type display members to said carriers, and detaching said card-shaped display members from said carriers, wherein said card attach/detach/transfer means is controlled by said control unit so that an individual one of said rewrite card type display members is attached to and detached from one carrier, and, after rewriting patient information on the recording layer with said writing means, the same rewrite card type display member is attached to the same carrier or a different carrier, and this cycle is repeated.*

*13. A drug dispensing device comprising:*

*a carrier supply device including a plurality of drug carriers;*

*a transport device for transporting said carriers from said carrier supply device;*

*a dispensing machine for dispensing drugs into said carriers;*

*a plurality of rewrite card type display members detachably attached to said carriers, respectively, each of said rewrite card type display members including a recording layer,*

*wherein each of said rewrite card type display members is capable of displaying patient information upon application of a specific temperature to write or erase letters on the recording layer;*

*a writing means for repeatedly writing patient information on the recording layer of each of said rewrite card type display members by applying the specific temperature with a thermal head, and erasing such information from the recording layer;*

*a controller for controlling said dispensing machine to dispense drugs into said carriers based on drug information derived from prescriptions,*

*said controller being operable to control said writing means to erase old patient information from said rewrite card type display members attached to said carriers, and write new patient information on said rewrite card type display members; and*

*a card attach/detach/transfer means arranged along said transport device for attaching said rewrite card type display members to said carriers, and detaching said card-shaped display members from said carriers, wherein said card attach/detach/transfer means is controlled by said control unit so that an individual one of said rewrite card type display members is attached to and detached from one of said carriers, and, after rewriting patient information on the recording layer with said writing means, the same rewrite card type display member is attached to the same carrier or a different carrier, and this cycle is repeated.*

* * * * *